US006960379B1

(12) United States Patent
Conroy et al.

(10) Patent No.: US 6,960,379 B1
(45) Date of Patent: Nov. 1, 2005

(54) CEMENTITIOUS COMPOSITIONS AND THEIR USE IN CORROSION PROTECTION

(75) Inventors: Paul James Conroy, Swindon (GB); John Brian Newman, London (GB); Lisa Anne Hudson, London (GB)

(73) Assignee: WRC PLC, Marlow (GB)

(*) Notice: Subject to any disclaimer, the term of this patent is extended or adjusted under 35 U.S.C. 154(b) by 0 days.

(21) Appl. No.: 09/355,635

(22) PCT Filed: Feb. 2, 1998

(86) PCT No.: PCT/GB98/00305

§ 371 (c)(1),
(2), (4) Date: Aug. 2, 1999

(87) PCT Pub. No.: WO98/33749

PCT Pub. Date: Aug. 6, 1998

(30) Foreign Application Priority Data

Feb. 1, 1997 (GB) .................................. 9702119

(51) Int. Cl.[7] .................... B29D 21/00; B29D 23/00; B32B 1/08
(52) U.S. Cl. .................. 428/36.92; 428/294.7; 428/325; 427/230; 427/234; 427/239; 138/146
(58) Field of Search .................. 524/5, 8, 650; 428/34.4, 36.9, 36.92, 294.7, 325; 427/234, 427/238, 239, 421, 427, 430.1, 943.2, 444, 427/230; 264/340; 138/145, 146

(56) References Cited

U.S. PATENT DOCUMENTS 4,298,634 A * 11/1981 Phelps ........................ 427/183
4,454,172 A *  6/1984 Heinrich et al. ............ 427/234
5,531,824 A *  7/1996 Burkes et al. ............... 106/737

FOREIGN PATENT DOCUMENTS

| DE | 19600445 |   | 7/1997 |            |
|----|----------|---|--------|------------|
| GB | 2294259  |   | 4/1996 |            |
| WO | 8902878  |   | 4/1989 |            |
| WO | 96/11863 | * | 5/1995 | ... C04B 28/04 |
| WO | 9511863  |   | 5/1995 |            |

OTHER PUBLICATIONS

Chemical Abstracts, vol. 115, No. 24, Dec. 16, 1991, No. 262057n entitled "Lining of Water Pipes with Mortar" from JP 03 164 459.

* cited by examiner

*Primary Examiner*—Michael C. Miggins
(74) *Attorney, Agent, or Firm*—Dykema Gossett PLLC

(57) ABSTRACT

A cementitious composition (1) which, in the hardened state, acts as a low leaching coating in low alkalinity and low hardness waters. The composition comprises at least one cement and a highly reactive pozzolan. The cementitious composition can be applied to a surface such as a metallic drinking water pipe (2) in order to provide corrosion protection therefor.

17 Claims, 5 Drawing Sheets

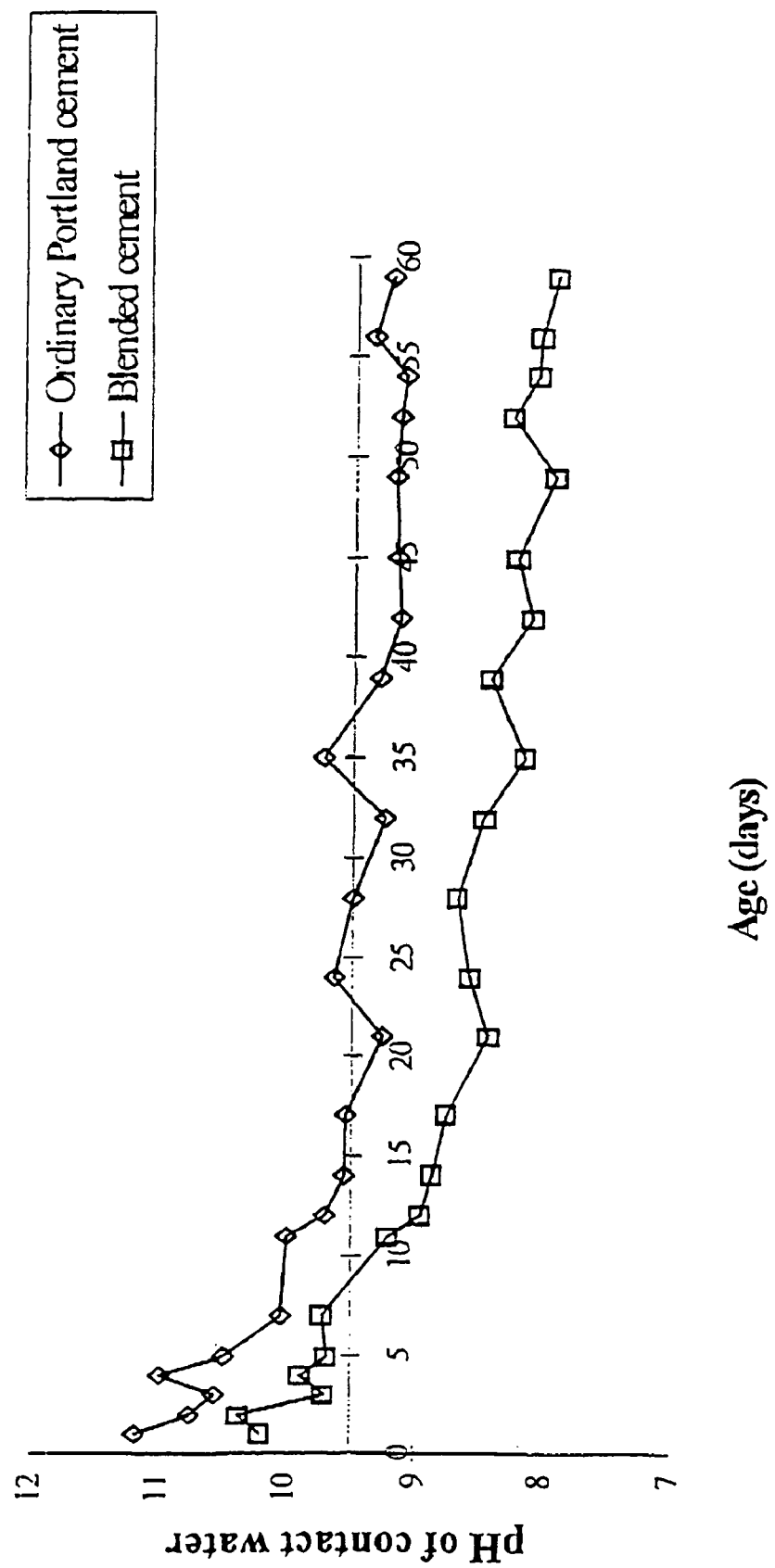

CEMENTITIOUS COMPOSITIONS AND THEIR USE IN CORROSION PROTECTION

BACKGROUND OF THE INVENTION

1. Field of the Invention

The present invention relates to cementitious compositions, and relates to the use of such compositions in corrosion protection.

2. The Prior Art

The present invention relates to cementitious compositions, and relates to the use of such compositions in corrosion protection.

The corrosion of metals in contact with water occurs by an aqueous electrochemical mechanism. This involves the presence of water containing dissolved ions at the metal surface, and the corresponding transfer of the electrons from the metal surface to the aqueous environment in contact with it. Corrosion protection involves interfering with these processes.

Current internal protection systems for water pipes usually consist of either cement mortars or epoxy resin polymeric coatings. Cement mortars suffer from a number of problems, such as lime leaching when placed in low alkalinity and low hardness waters. This results in impaired water quality by increasing the pH (ie the alkalinity) and calcium concentrations, and causes structural deterioration of the cement mortar, which results in poor durability. Epoxy resins can also suffer from a number of problems: if they are insufficiently cured, then there may be problems with water quality; there may be blistering; and there may be poor coverage at pipe joints.

SUMMARY OF THE INVENTION

We have now found a way to improve corrosion protection of metal surfaces, such as metallic drinking water pipes. We achieve this by providing a cementitious composition which, in the hardened state, acts as a low leaching and durable coating in low alkalinity and low hardness waters.

According to one aspect of the invention there is provided a method of protecting a surface from corrosion, comprising applying to the surface a cementitious composition which, in the hardened state, acts as a low leaching coating in low alkalinity and low hardness waters.

The method can be used to protect a wide variety of surfaces from corrosion. The method is of particular use in preventing the corrosion of metal pipes from corrosion caused by moisture. The method has particular application to the protection of the inside of drinking water pipes.

After the cementitious composition has been applied to the surface, it can be left to harden. In general, sufficient hardening will occur within about 24 hours, but it may take several weeks for the composition to finish curing.

The thickness of the composition depends upon the application. Typically the composition would be applied to a thickness in the range 2 to 16 mm, and usually the thickness would be in the range 4 to 8 mm.

The cementitious composition advantageously comprises at least one cement and a component which is capable of reacting with free lime. This reduces the amount of lime available to leach. Advantageously, the cementitious composition comprises at least one hydraulic cement and a highly reactive pozzolan—the pozzolan is capable of reacting with the free lime.

It is preferred that the composition comprises not more than 50 parts by weight pozzolan, based on the weight of the dry composition, and not less than 5 parts by weight pozzolan based on weight of the dry composition. It is more preferred that the composition comprises not more than 30 parts by weight pozzolan, based on the weight of the dry composition.

In one embodiment, the cementitious composition may further comprise a cement replacement material, preferably in an amount of not more than 70 parts by weight, based on the dry composition. The cement replacement material assists in producing a dense cement with a fine pore structure in the hardened cement paste. The cement replacement material is preferably ground granulated blast furnace slag (GGBFS—available from Civil and Marine Slag Cement Limited), activated blast furnace slag, pulverised fuel ash (PFA—available from Pozzolanic Lytag) and/or microsilica powder (e.g. grade 940U available from Elkem Materials).

In certain embodiments, the composition may comprise not more than 10 parts by weight pozzolan, based on the dry composition. For example, when the cement replacement material is provided, it is preferred that the composition comprises not more than 10 parts by weight pozzolan, based on the dry composition.

A wide variety of cements may be used. Ordinary Portland cement (OPC) has been found to be very suitable. Examples of three commercially available cements that are suitable for use with the present invention are: ordinary Portland cement to B.S. 12:1991 class 42.5N; Ferrocrete which is a rapid-hardening Portland cement to B.S. 12:1991 class 52.5N; and Sulfacrete which is a sulphate resisting Portland cement to B.S. 4027:1991 class 42.5N. All three of these cements are available from Blue Circle Industries.

The cement may be a Microcem cement, i.e., a superfine Portland cement having a greater surface area than conventional Portland cements. Microcem 550, Microcem 650SR or Microcem 900 may, for example, be used in the invention.

In an embodiment, the cement is a hydraulic cement. The hydraulic cement is preferably calcium silicate cement.

Pozzolans are silaceous and aluminous materials, such as certain fly ashes and blast furnace slags, which, in finely divided form, will exhibit cementitious properties when mixed with, for example, lime and water. We prefer to use a highly reactive pozzolan. We have obtained exceptionally good results when the pozzolan is metakaolin. Metakaolins can be formed from Kaolinite ($Al_2Si_2O_5(OH)_4$) by heating, for example to about 500° C. to about 800° C. Metakaolin is available from, for example, English China Clay International. Grade Metastar 501, available from English China Clay International, has been found to be very suitable.

The cementitious composition used in the method according to the invention may comprise other materials, such as aggregate and a reinforcement material such as a fibre reinforcement. The aggregate would typically be a fine grade silver sand having a moisture content of, for example, 4.7%. The reinforcement may be a polymeric fibre and may be present in an amount up to 40 parts by weight, based on the total weight of the dry composition.

The cementitious material may include other materials, such as silica fume.

In general, the cementitious composition according to the invention is mixed with water before use. This results in the formation of a cement paste. We prefer that the composition comprises not more than 50 parts by weight water, based on the wet composition.

The composition may be mixed with sand in order to form a cementitious mortar. This cementitious mortar may then be applied to the surface to be protected. In general, the amount of sand will be about the same as the amount of cement.

In accordance with the invention a particularly preferred cementitious composition comprises:
Metakaolin: 5 to 15 wt %
OPC: 10 to 30 wt %
GGBFS: 60 to 80 wt %
The most preferred cementitious composition comprises:
Metakaolin: 10 wt %
OPC: 20 wt %
GGBFS: 70 wt %

A particularly effective cement mortar composition would comprise 1 part by weight of the cement composition with 1 part by weight sand and 0.35–0.55, preferably 0.40 to 0.45 parts by weight water.

According to another aspect of the invention there is provided a cementitious composition which, in the hardened state, acts as a low leaching coating in low alkalinity and low hardness waters.

Advantageously, the cementitious composition comprises at least one cement and a component that is capable of reacting with free lime, which component is preferably a highly reactive pozzolan.

Preferably, the composition comprises not more than 30 parts by weight pozzolan, based on the dry composition, and the composition comprises not less than 5 parts by weight pozzolan, based on the dry composition.

The cementitious composition according to this aspect of the invention may be provided with any combination of the features of the cementitious composition described in relation to the method of protecting a surface from corrosion protection. The cementitious composition may be mixed with sand to form a cementitious mortar composition.

The method and composition according to the present invention make it possible to protect pipes, especially drinking water pipes, from corrosion, without the usual problems associated with cement mortars or epoxy resins.

BRIEF DESCRIPTION OF THE DRAWINGS

Reference is now made to the accompanying drawings, in which:

FIGS. 4–6 are graphs of pH of contact water versus age for compositions made in accordance with Example 2.

DETAILED DESCRIPTION OF THE PREFERRED EMBODIMENT

Figure 1:
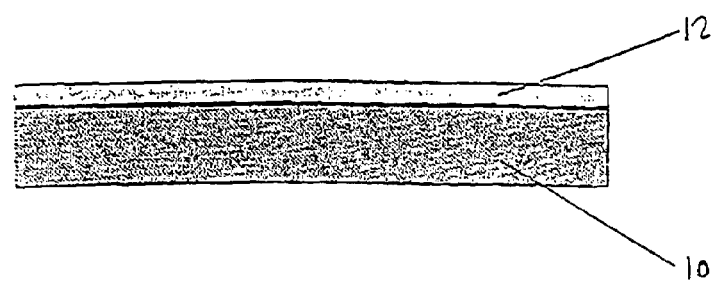
FIG. 1 is a cross-sectional view of a flat surface that has been treated with a cementitious composition according to the invention.

In FIG. 1 a substantially planar metallic substrate 10 has been coated with a layer 12 of a cementitious composition comprising a hydraulic cement, a pozzolan and water. The cementitious composition was applied in the form of a paste to form the layer 12 and was then left to set. The cementitious material cured while in contact with the metallic substrate 10 and provides an alkaline environment in contact with the surface of the substrate 10. Once fully cured, the cementitious coating protects the substrate 10 from electrochemical corrosion and also from leaching of the cement by drinking water.

Figure 2:
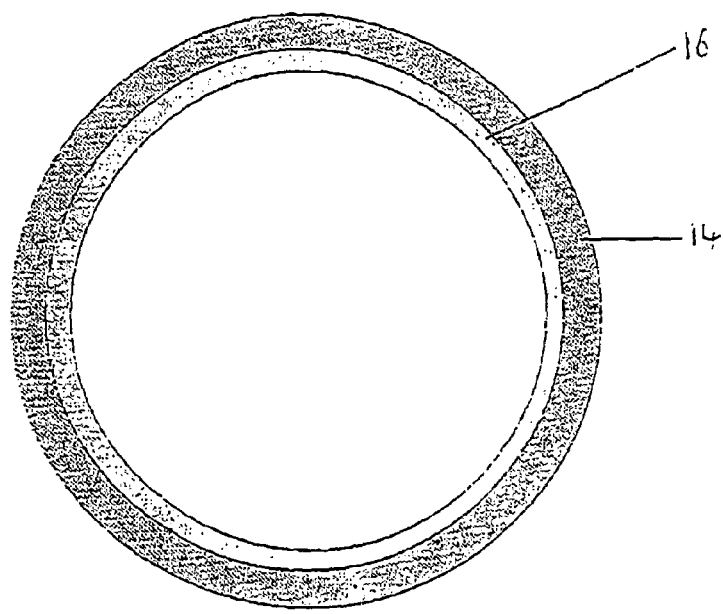
FIG. 2 is a cross-sectional view of a pipe that has been treated with a cementitious composition according to the invention.

In FIG. 2 a substantially cylindrical metallic pipe 14 has been coated with a layer 16 of a cementitious composition comprising a hydraulic cement, a pozzolan and water. As in FIG. 1, the cementitious composition was applied in the form of a paste to form the layer 16 and was then left to set. The cementitious material cured while in contact with the internal surface of the pipe 14 and provides an alkaline environment in contact with the internal surface of the pipe 14. Once fully cured, the cementitious coating product protects the pipe 14 from electrochemical corrosion and also from leaching of the cement by drinking water.

The following examples illustrate the invention.

EXAMPLE 1

Four cement compositions were prepared. One composition comprises 100 wt % OPC. The other three compositions comprised: 90 wt % OPC, 10 wt % metakaolin; 80 wt % OPC, 20 wt % metakaolin; and 70 wt % OPC, 30 wt % metakaolin.

Each composition was mixed with water and sand at the sand:cement:water ratio 1:1:0.45.

Figure 3:
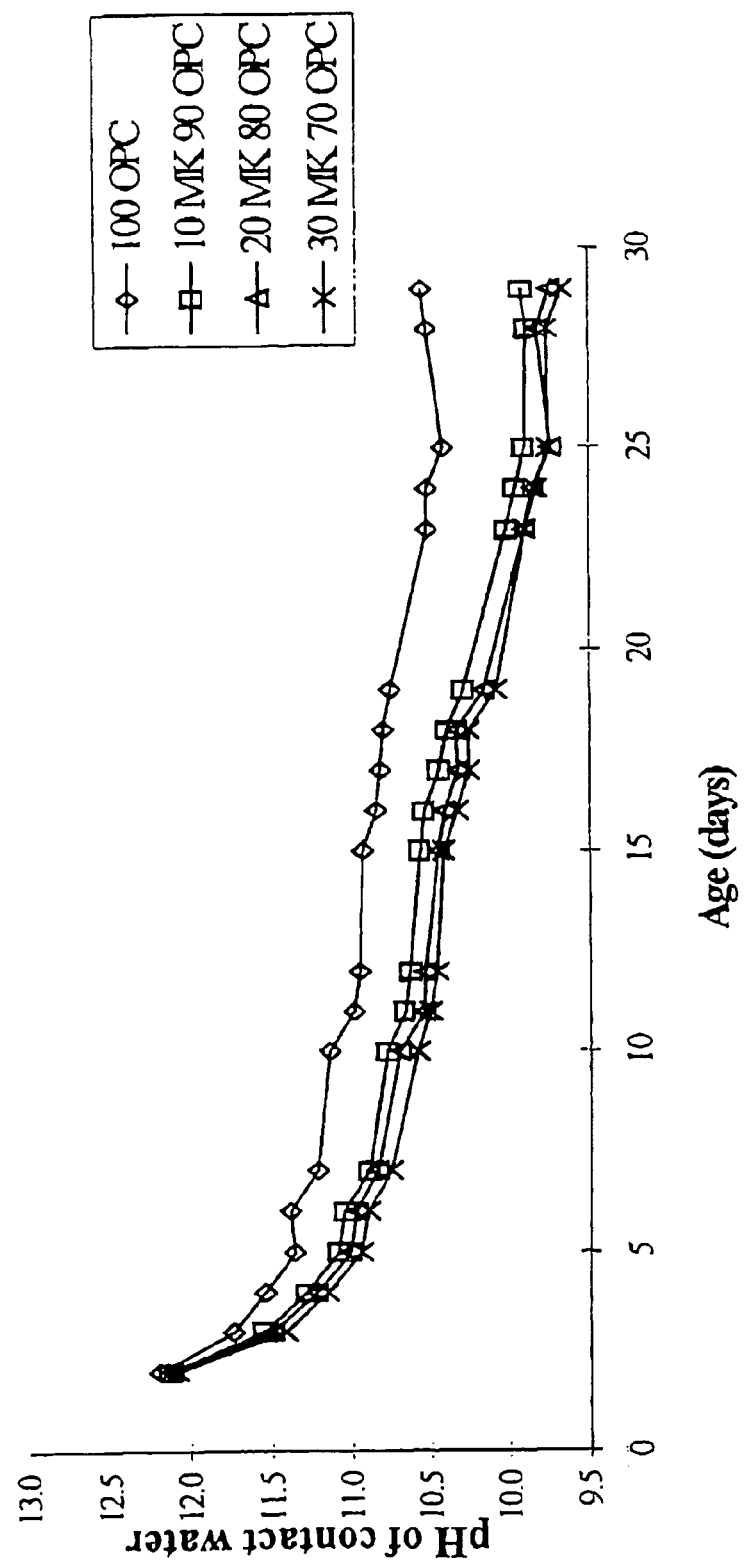
FIG. 3 is a graph of pH of contact water versus age for compositions made in accordance with Example 1.

Blocks of the cement were exposed to a low alkalinity water and the pH was monitored with time. There was a 24 hour retention time. The water hardness was 20 mg/l as $CACO_3$. The results are shown in FIG. 3, from which it is clear that the compositions containing metakaolin performed much better than the other compositions.

EXAMPLE 2

A cement composition was made comprising:
(1) 20 wt % OPC to B.S. 12:1991 class 42.5N available from Blue Circle Industries.
(2) 70 wt % GGBFS from Civil and Marine Slag Limited
(3) 10 wt % metakaolin, grade Metastar 501 from English China Clay International (which is a particularly highly purified form of metakaolin).

Two ductile iron pipes of 100 mm diameter and 3 m total length were cut into 12×250 mm length sections. Each pipe was then in situ lined using standard small bore pipe rehabilitation equipment with the assistance of a local contractor. One pipe was lined with OPC blended with sand and water in the ratio 1:1:0.4. The second pipe was lined with the ternary composition according to the invention blended with sand and water in the ratio 1:1:0.43. The difference in water quantity was to produce optimum pump and surface finish properties.

After lining, the pipe sections were placed in airtight bags (to eliminate air circulation) with an environment humidity of about 62%, and were allowed to cure overnight at about 10° C. for about 24 hours.

Figure 4:
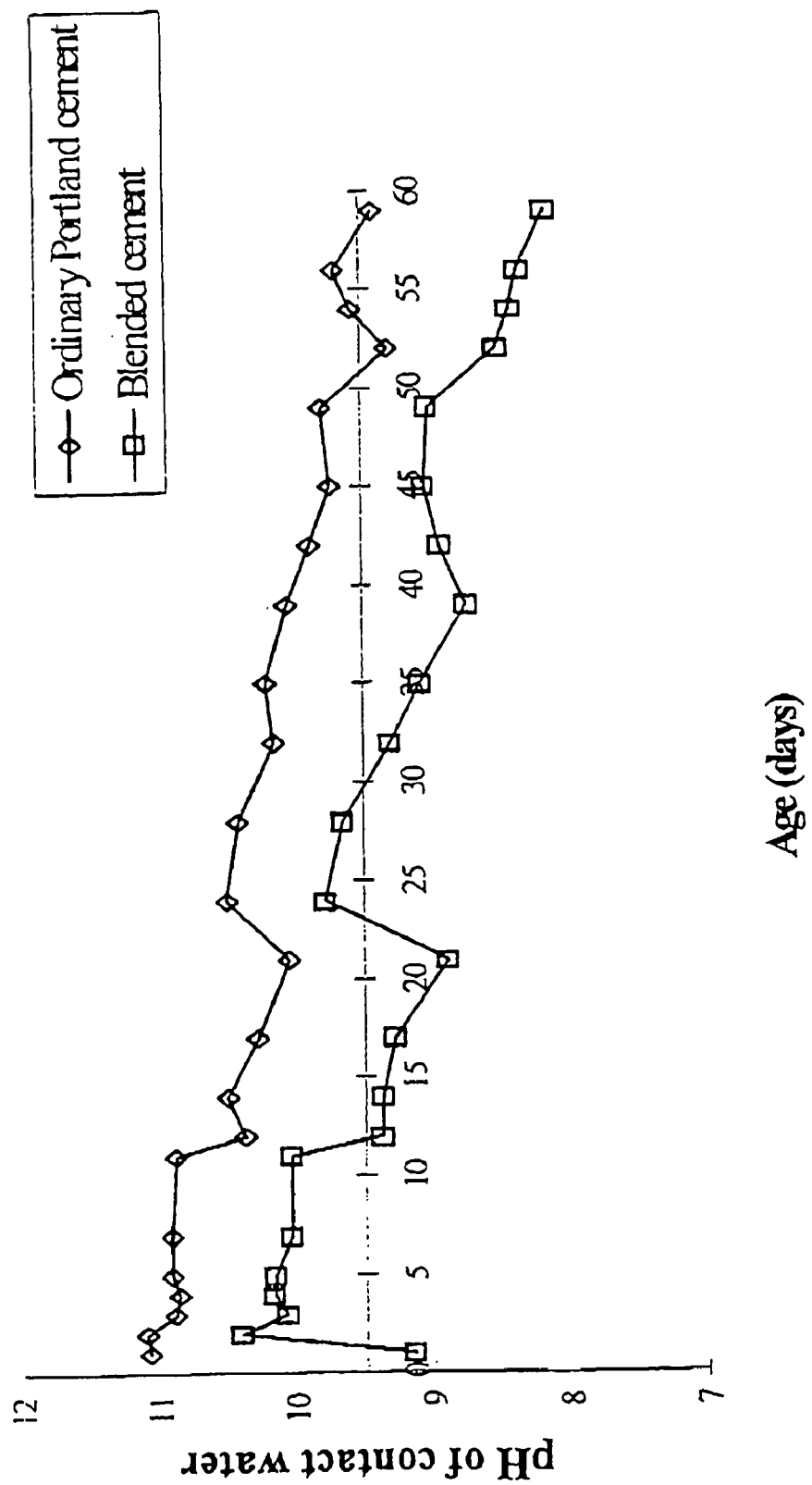
Figure 5:
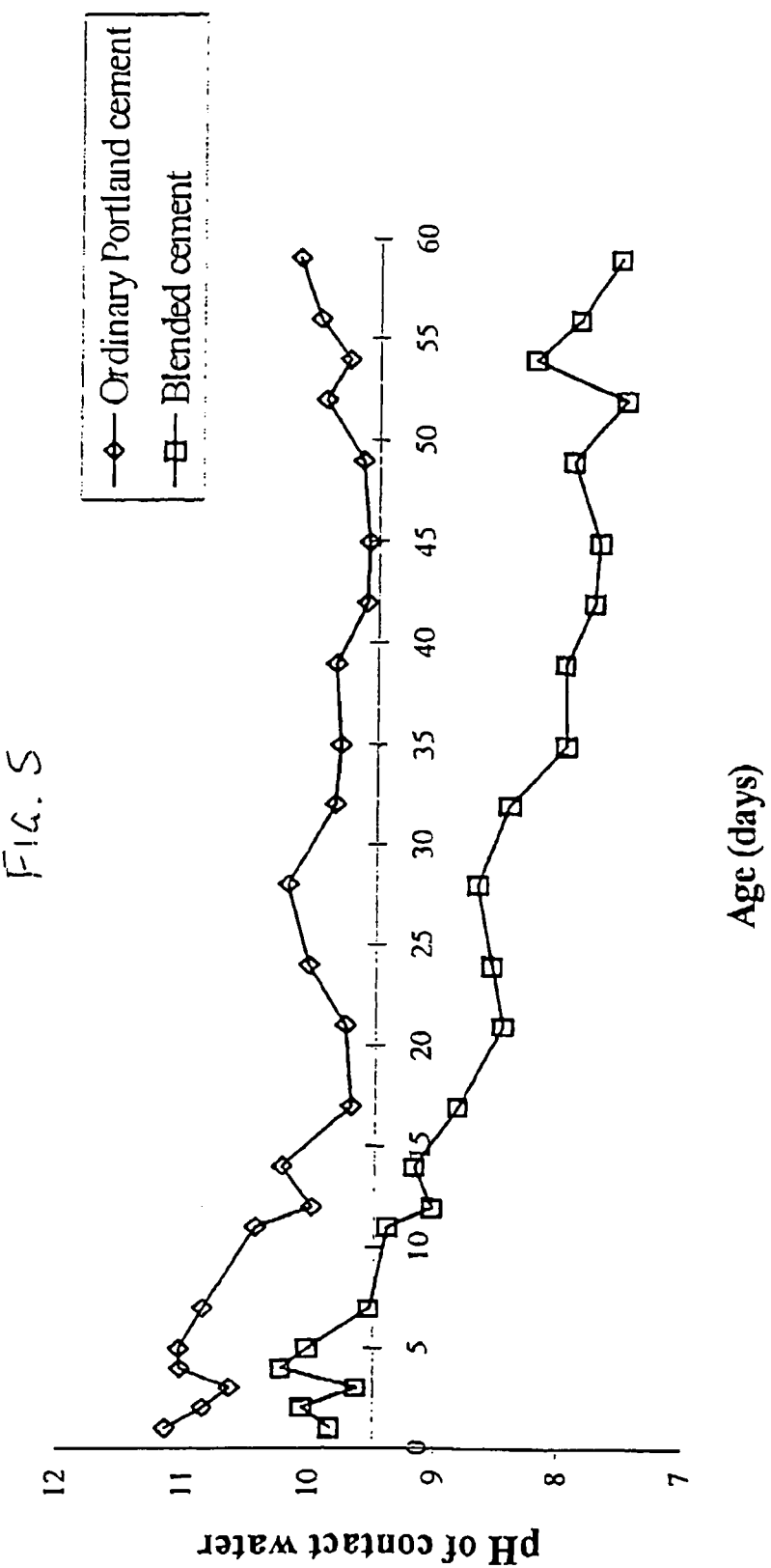

The effectiveness of the ternary blend was compared with the OPC over three different water hardnesses, and the results are shown in FIGS. 4 to 6. In each case the retention time was 8 hours. In FIG. 4 there was 10 mg/l as $CaCO_3$, in FIG. 5 there was 35 mg/l as $CaCO_3$ and in FIG. 6 there was 55 mg/l as $CaCO_3$. In each case the composition according to the invention resulted in significant reductions in lime leaching.

It will be appreciated that the invention may be modified within the scope of the appended claims.

What is claimed is:

1. A method for protecting a metal drinking water pipe used for delivering drinking water from corrosion due to water passing therethrough comprising the steps of:

(a) providing a metal drinking water pipe,
(b) depositing a cementitious composition on an inside surface of said metal drinking water pipe to form a lining therein, said cementitious composition comprising portland cement and 5–30 weight % metakaolin, based on the weight of the cementitious composition when dry, and
(c) hardening said cementitious composition.

2. A method according to claim 1, wherein the cementitious composition comprises not more than 10 parts by weight metakaolin.

3. A method according to claim 1, wherein part of the portland cement is replaced with a cement replacement material in an amount of not more than 70 parts by weight, based on the weight of the cementitious composition when dry.

4. A method according to claim 3, wherein said cement replacement material is at least one of ground granulated blast furnace slag and pulverized fuel ash.

5. A method according to claim 1, wherein the cementitious composition further comprises an aggregate material.

6. A method according to claim 1, wherein the cementitious composition further comprises fibers as reinforcement.

7. A method according to claim 1, wherein the cementitious composition further comprises water.

8. A method according to claim 7, wherein the cementitious composition comprises not more than 50 parts by weight water, based on the weight of the cementitious composition when wet.

9. A method according to claim 1, including, between steps (a) and (b), the step of mixing the cementitious composition with sand to form a cementitious mortar composition, prior to being applied to said surface.

10. A method according to claim 1 consisting of steps (a), (b) and (c).

11. A drinking water pipe comprising a hollow metallic conduit and a coating provided on at least one of an internal and external surface of the conduit, wherein the coating comprises Portland cement in combination with metakaolin, and wherein the coating comprises 5 to 30 parts by weights metakaolin, based on the weight of the coating when dry.

12. A pipe according to claim 11, wherein the coating comprises not more than 10 parts by weight metakaolin.

13. A pipe according to claim 11, wherein part of the cement is replaced with a cement replaceable material in an amount of not more than 70 parts by weight.

14. A pipe according to claim 13, wherein said cement replacement material is at least one of ground granulated blast furnace slag and pulverized fuel ash.

15. A pipe according to claim 11, wherein the cement is calcium silicate cement.

16. A pipe according to claim 11, further comprising at least one of aggregate and fibers as reinforcement.

17. A pipe according to claim 16, wherein the coating comprises not more than 50 parts by weight water, based on the weight of the cementitious composition when wet.

* * * * *